United States Patent [19]

Umezawa

[11] Patent Number: 4,748,510

[45] Date of Patent: May 31, 1988

[54] DRIVE CIRCUIT FOR LIQUID CRYSTAL DISPLAY DEVICE

[75] Inventor: Toshimitsu Umezawa, Kazo, Japan

[73] Assignee: Kabushiki Kaisha Toshiba, Kawasaki, Japan

[21] Appl. No.: 30,070

[22] Filed: Mar. 25, 1987

[30] Foreign Application Priority Data

Mar. 27, 1986 [JP] Japan .................................. 61-67083

[51] Int. Cl.⁴ .......................... H04N 5/70; H04N 3/14

[52] U.S. Cl. ...................................... 358/236; 358/241; 340/784

[58] Field of Search ........................ 358/236, 241, 230; 340/784

[56] References Cited

U.S. PATENT DOCUMENTS 4,427,978 1/1984 Williams .............................. 358/236

4,630,122 12/1986 Morokawa .......................... 358/241

4,635,127 1/1987 Togashi ............................... 358/236

FOREIGN PATENT DOCUMENTS 159817 12/1979 Japan .................................... 358/236

OTHER PUBLICATIONS

A Pocketable Liquid Crystal Television Receiver, by Kokado, et al., IEEE Transactions on Consumer Electronics, vol. Ce-27, No. 3, Aug. 1981; pp. 462–469.

Nikkei Electronics (9–10, 1984; pp. 233–236).

*Primary Examiner*—Tommy P. Chin

*Attorney, Agent, or Firm*—Cushman, Darby & Cushman

[57] ABSTRACT

A liquid crystal display device includes a liquid crystal display, which has a plurality of liquid crystal elements arranged in a matrix and has signal electrodes and scanning electrodes provided with respect to the liquid crystal elements. A signal electrode driver, for driving the signal electrodes of the liquid crystal display, has a driver and a switch circuit. This switch circuit comprises groups of switches connected in multi-stages in the column direction. Each switching stage includes a plurality of switches, the number of which increases from one stage to another toward the final stage. The switches of the first switching stage have their input terminals supplied with video signals, respectively. The output terminal of each switch of one switching stage is branched and coupled to the input terminals of associated switches of the succeeding stage. The output terminals of the switches of the last switching stage are respectively coupled to the signal electrodes. The actuation of the switches of each switching stage is controlled by a driver such that they are sequentially activated one at a time.

11 Claims, 3 Drawing Sheets

DRIVE CIRCUIT FOR LIQUID CRYSTAL DISPLAY DEVICE

BACKGROUND OF THE INVENTION

This invention relates to a drive circuit for a liquid crystal display device, and more particularly, to a drive circuit for a liquid crystal television receiver.

A known liquid display device has scanning electrodes and signal electrodes provided for liquid crystal elements arranged in a matrix, and uses a scanning electrode driver and a signal electrode driver to drive these electrodes in order to display an image based on input data.

An example of such a conventional liquid crystal display device is disclosed in NIKKEI ELECTRONICS, 1984 9-10, PP. 233-236. This device has a liquid crystal display having a plurality of liquid crystal elements arranged in a matrix. For each liquid crystal element, a signal electrodes $X_1$, $X_2$, . . . , and $X_n$ and a scanning electrodes $Y_1$, $Y_2$, . . . , and $Y_m$ are provided. For example, liquid crystal element $L_1$ is coupled to signal electrode $X_1$ and scanning electrode $Y_1$ in the following manner. Signal electrode $X_1$ and scanning electrode $Y_1$ are respectively coupled to the drain and gate of a thin-film transistor (TFT). The source of the TFT is grounded through a signal accumulation capacitor $C_1$ and also coupled to one terminal of liquid crystal element $L_1$, which has the other terminal coupled to a common electrode.

A liquid crystal display device having the afore-mentioned liquid crystal display processes a signal received by an antenna and provides a video signal whose polarity changes for each field. The received signal is also processed to provide a clock and a data pulse, which are supplied to the signal eleotrode driver and scanning electrode driver.

The signal electrode driver, which is also called an X driver, comprises, for example, shift register and receives a horizontal sync signal H (15.75 KHz) as well as the clock and the data pulse. The scanning electrode driver, which is also called a Y driver, also comprises shift register, for example. The scanning electrode driver receives a vertical sync signal V (60 Hz) in addition to the clock and the data pulse.

The signal electrode driver also has a switch circuit which receives the video signal. The switch circuit includes switch means $S_1$, $S_2$, . . . , and $S_n$, whose input terminals are supplied with the video signal and whose output terminals are respectively coupled to signal electrodes $X_1$, $X_2$, . . . , and $X_n$. The activation of these switch means $S_1$-$S_n$ is controlled by the shift register.

In the liquid crystal display device having the above structure, scanning electrodes $Y_1$-$Y_m$ are sequentially driven in synchronization with one horizontal scanning period (1H) of the video signal. During this period, switch means $S_1$-$S_n$ respectively coupled to signal electrodes $X_1$-$X_n$ are activated, thus supplying signals to the associated signal accumulation capacitors $C_1$-$C_n$. The supplied signals respectively energize liquid crystal elements $L_1$-$L_n$ until the scanning of the next frame.

In the liquid display device, provided that the number of pixels of the liquid crystal display in the X direction (lateral direction) is N, the number of the switch means ($S_1$-$S_n$) required is also N. Typical switch means are C-MOS analog switches.

Since each switch means has an input capacitance, the input capacitance C of the switch circuit is $$C = N \cdot C_0,$$

where $C_0$ is the input capacitance of each switch means $S_1$, . . . , or $S_n$. Therefore, the greater the number of the pixels provided by the liquid crystal elements, the greater the input capacitance of the switch circuit. To cope with this problem, a buffer circuit is provided on the prior stage to the switch circuit. The buffer circuit is constituted, for example, by a transistor which has a base supplied with a video signal, an emitter grounded through a constant current source I and a collector coupled to a power source Vcc. The switch circuit is coupled to the emitter of the transistor.

Since the buffer circuit drives a load having a capacitance C, it is necessary to supply a current above a certain value to constant current source I. Assuming that the amount of the current is I, then $$I > 2\pi fCV,$$

where f is the maximum frequency of a signal and V is the maximum amplitude of the signal.

Therefore, the dissipation power P of the buffer circuit is $$P > Vcc\ I.$$

As a compact or portable liquid crystal display device is designed to be battery-driven, an increase in the capacitance C (the dissipation power) is fatal and should be avoided.

Provided that the number of switch means $S_1$-$S_n$ is $n=400$ and the input capacitance $C_0$ of each switch means is 1 pF, this yields $$C = N \cdot C_0 = 400 \times 1 = 400 \text{ pF}.$$

However, an input video signal is adversely influenced even when the capacitance C is about 100 pF. In this respect, it is desirable to reduce the input capacitance C.

SUMMARY OF THE INVENTION

With the above situation in mind, it is an object of this invention to provide a drive circuit for a liquid crystal display device, whose switch circuit has a significantly reduced input capacitance, and which prevents dissipation power from increasing when the number of pixels is increased and ensures that a video signal is not adversely influenced by the input capacitance.

To achieve this object, the drive circuit of this invention comprises:

input means for receiving a signal to be displayed;

liquid crystal display means having a plurality of liquid crystal elements arranged in a matrix and having scanning electrodes and signal electrodes provided with respect to the liquid crystal elements;

scanning electrode driving means, coupled to the scanning electrodes, for sequentially driving the scanning electrodes;

a plurality of switching stages, coupled in columns, each of which includes a plurality of switch means, each of the switch means of the first switching stage having an input terminal coupled to the input means and having an output terminal branched so that the output terminal is coupled to input terminals of associated switch means located in a succeeding switching stage, and output terminals of the switch means of the last switching stage being respectively coupled to the signal electrodes; and drive control means, coupled to each of the switch means, for sequentially activating the switch means of each switching stage one at a time in such a manner that the signal electrodes are sequentially driven by the signal to be displayed.

DETAILED DESCRIPTION OF THE PREFERRED EMBODIMENT

An embodiment of this invention will now be explained with reference to the accompanying drawings.

Figure 1:
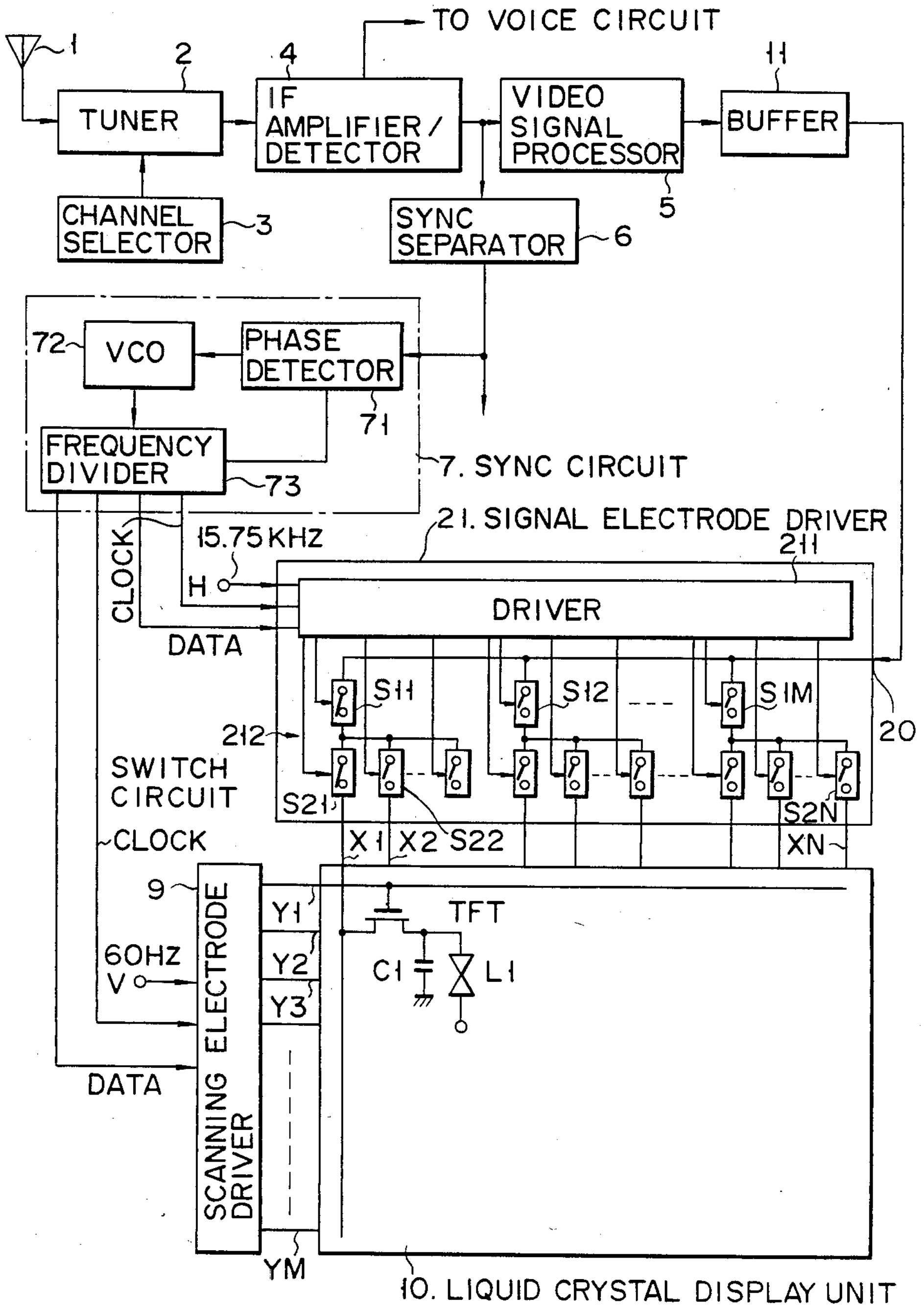
FIG. 1 is a block diagram showing an example of liquid crystal display device having a drive circuit of this invention.

FIG. 1 shows a liquid crystal television receiver as an example of a liquid crystal display device. A signal coming into an antenna 1 is supplied to a tuner which supplies a signal on a channel selected by a channel selector 3, to the next stage, an intermediate frequency (IF) amplifier/video signal detector 4. The output of IF amplifier/video signal detector 4 is supplied to video signal processor 5 and sync signal separator 6. Sync signal separator 6 separates vertical and horizontal sync signals from a composite video signal and transfers the sync signals to a sync circuit 7.

Sync circuit 7 has a phase-locked loop (PLL) constituted by a phase detector 71, a voltage-controlled oscillator (VCO) 72 and a frequency divider 73. Sync circuit 7 supplies a clock and a data pulse from frequency divider 73 to a signal electrode driver 21 and a scanning electrode driver 9. Signal electrode driver 21, which is also called an X driver, comprises a driver 211. In addition to the clock and data pulse, a horizontal sync signal H (15.75 KHz) is supplied to signal electrode driver 21. Scanning eleotrode driver 9, also called a Y driver, comprises shift register, for example, and receives a vertical sync signal V (60 Hz) as well as the clock and the data pulse.

A liquid crystal display 10 has a plurality of liquid crystal elements arranged in a matrix. Signal electrodes $X_1$, $X_2$, . . . , and $X_n$ and scanning electrodes $Y_1$, $Y_2$, . . . , and $Y_m$ are provided with respect to the liquid crystal elements. For example, liquid crystal element $L_1$is coupled to signal electrode $X_1$ and scanning electrode $Y_1$ in the following manner. Signal eleotrode $X_1$ and scanning electrode $Y_1$ are respectively coupled to the drain and gate of a thin-film transistor (TFT). The source of the TFT is grounded through a signal accumulation capacitor $C_1$ and also coupled to one terminal of liquid crystal element $L_1$. The other terminal of this liquid crystal element $L_1$ is coupled to a common eleotrode.

Video signal processor 5 provides a signal having both the positive and negative polarities, from an input video signal and outputs the video signal, changing its polarity by a transmission gate for each field. The output of video signal processor 5 is supplied to a switch circuit 212 of signal electrode driver 21 through a buffer amplifier 11. Switch circuit 212 comprises groups of switch means arranged in multi-stages (two stages in FIG. 1) in the column direction. Provided that the total number of signal electrodes $X_1$–$X_n$ of liquid display 10 is N, the number of switch means $S_{11}$, $S_{12}$, . . . , and $S_{1M}$ of the first stage is M ($M < N$) and the video signal from buffer amplifier 11 is supplied via a video signal input terminal 20 to the input terminal of each switch means. The output of each of the switch means $S_{11}$–$S_{1M}$ is coupled to the input terminals of the associated number of switch means of switch means $S_{21}$, $S_{22}$, . . . , and $S_{2N}$ of the next stage. The output terminals of the switch means of the last stage are respectively coupled to signal electrodes $X_1$–$X_n$. The total number of switch means of the last stage (the second stage in FIG. 1) is N.

The number of the switching stages for switch circuit 212 is not limited to two, but can be more as long as the number, M, of the switch means ($S_{11}$–$S_{1M}$) of the first stage coupled to video signal input terminal 20 is smaller than the total number, N, of signal electrodes $X_1$–$X_n$ (M desirably being a divisor of N) and the number of the switch means in the subsequent stage increases such that the number of switch means of the last stage is N.

Figure 2:
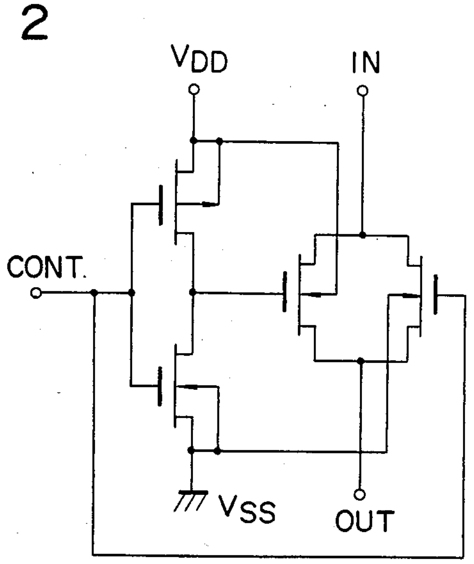
FIG. 2 is a circuit diagram exemplifying one of switch means of a switch circuit shown in FIG. 1.

Each switch means may be designed as shown in FIG. 2. A control signal (drive signal) from driver 211 is supplied to the switch means via a control input terminal CONT. The video signal from video signal input terminal 20 or the switch means of the proceeding stage is supplied to an input terminal IN. The video signal from input terminal IN is output from an output terminal OUT in response to the drive signal coming from control input terminal CONT. In FIG. 2, $V_{DD}$ is a voltage source and $V_{SS}$ is the ground.

Figure 3:
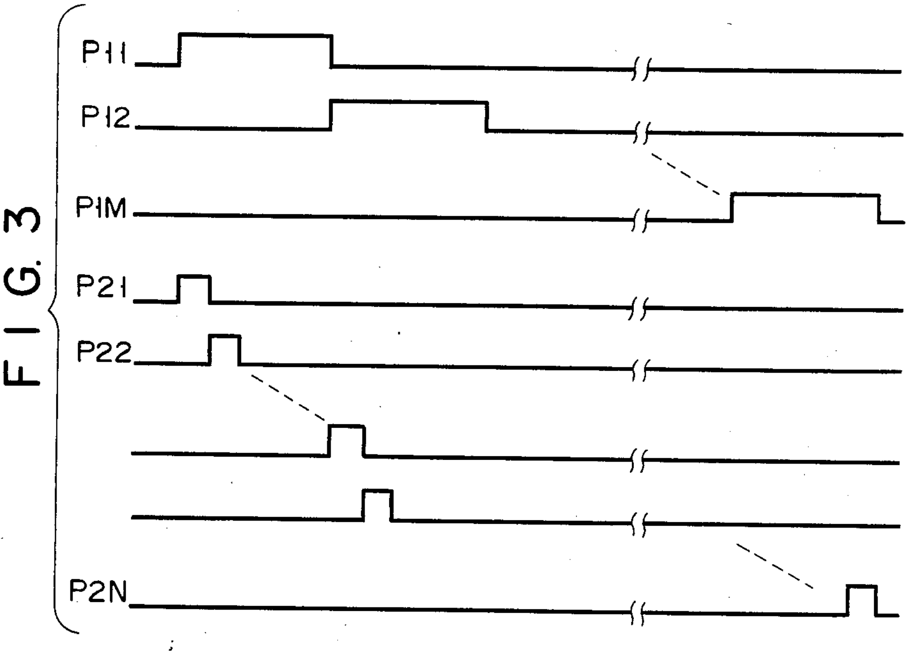
FIG. 3 is a timing chart showing output signals of a drive circuit shown in FIG. 1.

FIG. 3 shows output signals from driver 211, which control the activation of switch means $S_{11}$ to $S_{2N}$. Pulses P11, P12, . . . , and P1M activate switch means $S_{11}$–$S_{1M}$ of the first stage in a time-divisional manner, while pulses P2l, P22, . . . , and P2N activate switch means $S_{21}$–$S_{2N}$ of the next stage (last stage in FIG. 1) also in a time-divisional manner.

For example, when both of pulses P11 and P21 are generated, signal electrode $X_1$ is driven. When pulses P11 and P22 are generated, signal electrode $X_2$ is driven, and when pulses P1M and P2N are generated, signal electrode $X_n$ is driven.

Driver 211 for generating such pulse signals can be easily constituted by shift register or logic circuits.

With the use of the multi-stage switch circuit 212 in the drive circuit of this invention, the load capacitance $C_{10}$ of video signal input terminal 20 is expressed as $$C_{10} = \left( \frac{N}{M} + M \right) \cdot C_0,$$

where $C_0$ is the input capacitance of a single switch means (an analog switch).

This equation is obtained because only one of switch means $S_{11}$–$S_{1M}$ is always activated. Therefore, by selecting a value for M, the load capacitance $C_{10}$ can be minimized.

Figure 4:
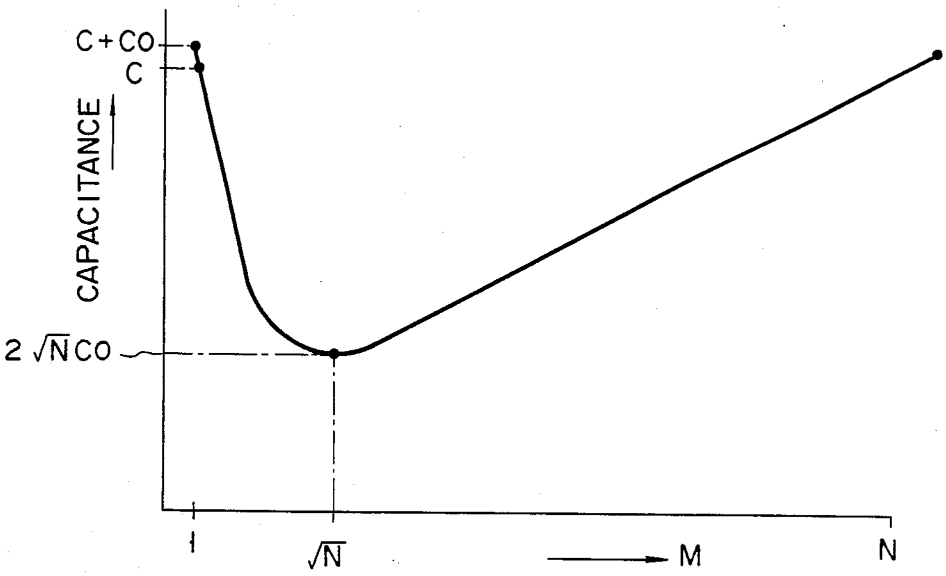
FIG. 4 is a characteristic curve showing an input capacitance of the switch circuit of FIG. 1.

FIG. 4 shows a variation in capacitance $C_{10}$ when the number of the stages is two and the number, M, of the switch means in the first stages is changed between 1 and N. The horizontal axis in the graph indicates the number, M, of the switch means of the first stage and the vertical axis indicates the load capacitance $C_{10}$. The load capacitance in a conventional circuit is expressed by "C."

It is understood from FIG. 4 that when $M=1$ and $M=N$, $C_{10}=C+C_0$, and the load capacitance $C_{10}$ is prominently large. When $M=\sqrt{N}$, however, the load capacitance takes the minimum value of $C_{10}=2\sqrt{N}\cdot C_0$. Accordingly, it is better that the number of the switch means of the first stage is closer to $\sqrt{N}$.

For example, $N=400$, $M=20$ and the capacitance $C_0$ of a single switch means is 1 pF, then $$C_{10} = \left(\frac{400}{20} + 20\right) \cdot 1 \text{ pF} = 40 \text{ pF}.$$

This value is one tenth of the capacitance (400 pF) obtained for the conventional circuit. Naturally, the dissipation power is also reduced to one tenth.

When the drive circuit of this invention is applied to a color television receiver, three primary color signals R (red), G (green) and B (blue) are supplied as video signals and R, G and B liquid crystal elements need to be arranged in a mosaic pattern accordingly.

This invention can also apply to data display devices of other types than a television receiver.

As explained above, the drive circuit of this invention can suppress the input capacitance of the switch circuit to a significantly small level even when the number of pixels involved is increased. This invention can therefore provide a liquid crystal display device with a lower dissipation power. The drive circuit of this invention is particularly suitable for a battery-driven type liquid crystal display device.

What is claimed is:

1. A drive circuit for a liquid crystal display device, comprising:
   - input means for receiving a signal to be displayed;
   - liquid crystal display means having a plurality of liquid crystal elements arranged in a matrix and having scanning electrodes and signal electrodes provided with respect to said liquid crystal elements;
   - scanning electrode driving means, coupled to said scanning electrodes, for sequentially driving said scanning electrodes;
   - a plurality of switching stages, coupled in columns, each of which includes a plurality of switch means, each of said switch means of the first switching stage having an input terminal coupled to said input means and having an output terminal branched so that said output terminal is coupled to input terminals of associated switch means located in a succeeding switching stage, and output terminals of said switch means of the last switching stage being respectively coupled to said signal electrodes; and
   - drive control means, coupled to each of said switch means, for sequentially activating said switch means of said each switching stage one at a time in such a manner that said signal electrodes are sequentially driven by said signal to be displayed.

2. The drive circuit according to claim 1, wherein said drive control means controls said switch means such that each of said switch means of one switching stage is kept activated until all of those switch means of the succeeding switching stage which are coupled to said each switch means of said one switching stage, are sequentially activated.

3. The drive circuit according to claim 2, wherein, with the number of said signal electrodes being N (N: a positive integer), the number of said switch means of said first switching stage is close to $\sqrt{N}$ and the number of said switch means of said last switching stage is N.

4. The drive circuit according to claim 3, wherein the number of said switching stages is two.

5. The drive circuit according to claim 4, wherein each of said switch means is a C-MOS analog switch.

6. The drive circuit according to claim 5, wherein said signal to be displayed is a video signal.

7. A liquid crystal television receiver comprising:
   - reception means for receiving a television signal to provide a video signal on a desired channel;
   - liquid crystal display means having a plurality of liquid crystal elements arranged in a matrix and having scanning electrodes and signal electrodes provided with respect to said liquid crystal elements;
   - scanning electrode driving means, coupled between said reception means and said scanning electrodes, for sequentially driving said scanning electrodes in synchronization with one horizontal scanning period of said video signal;
   - a plurality of switching stages, coupled in columns, each of which includes a plurality of switch means, each of said switch means of the first switching stage having an input terminal coupled to said reception means and having an output terminal branched so that said output terminal is coupled to input terminals of associated switch means located in a succeeding switching stage, and output terminals of said switch means of the last switching stage being respectively coupled to said signal electrodes; and
   - drive control means, coupled to said reception means and each of said switch means, for sequentially activating said switch means of each of said switching stage one at a time, all of said switch means of said last switching stage being sequentially activated during said one horizontal scanning period of said video signal.

8. The liquid crystal television receiver according to claim 7, wherein said drive control means controls said switch means such that each of said switch means of one switching stage is kept activated until all of those switch means of the succeeding switching stage which are coupled to said each switch means of said one switching stage, are sequentially activated.

9. The liquid crystal television receiver according to claim 8, wherein, with the number of said signal electrodes being N (N: a positive integer), the number of said switch means of said first switching stage is close to N and the number of said switch means of said last switching stage is N.

10. The liquid crystal television receiver according to claim 9, wherein the number of said switching stages is two.

11. The liquid crystal television receiver according to claim 10, wherein each of said switch means is a C-MOS analog switch.

* * * * *